Dec. 27, 1966     R. MARGAIRA     3,295,046
DETACHABLE SEMICONDUCTOR RECTIFIER UNIT FOR
ALTERNATING CURRENT GENERATOR
Filed July 2, 1963     5 Sheets-Sheet 1

Dec. 27, 1966  R. MARGAIRA  3,295,046
DETACHABLE SEMICONDUCTOR RECTIFIER UNIT FOR
ALTERNATING CURRENT GENERATOR
Filed July 2, 1963  5 Sheets-Sheet 2

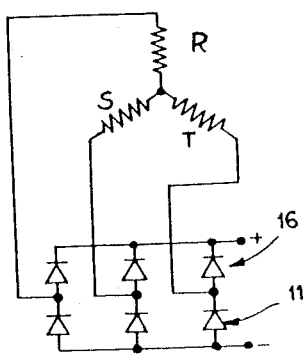
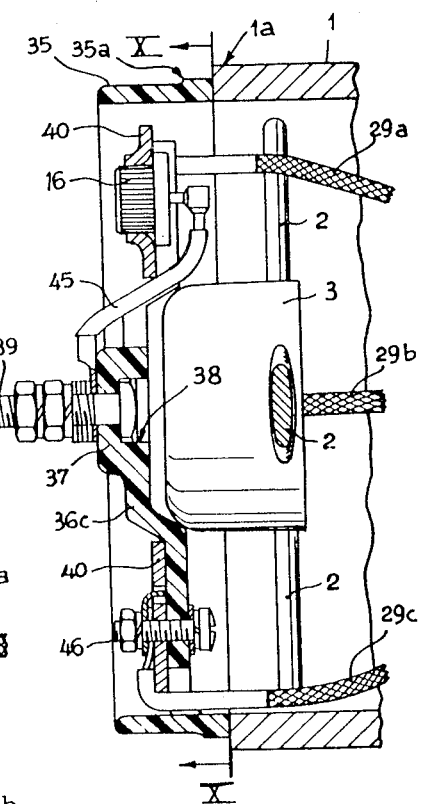
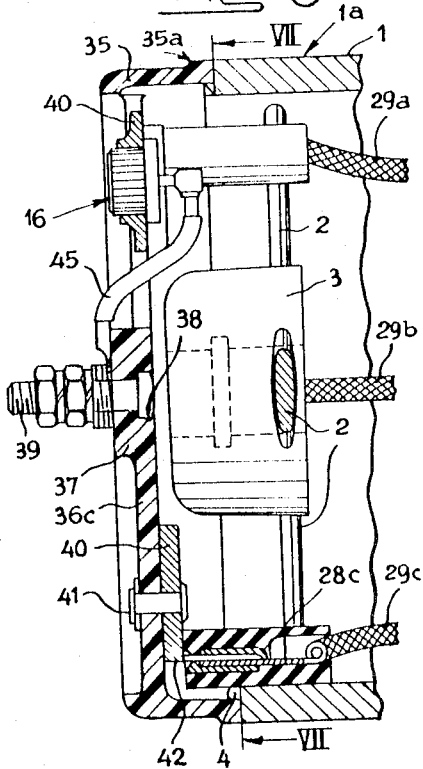

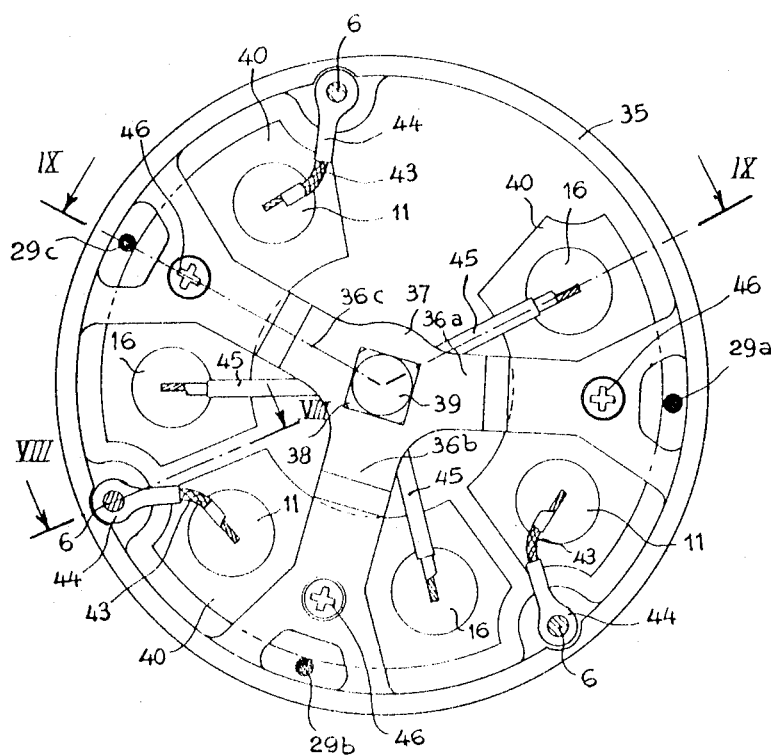

United States Patent Office 3,295,046
Patented Dec. 27, 1966

3,295,046
DETACHABLE SEMICONDUCTOR RECTIFIER UNIT FOR ALTERNATING CURRENT GENERATOR
Rinaldo Margaira, Turin, Italy, assignor to Fiat Societa per Azioni, Turin, Italy
Filed July 2, 1963, Ser. No. 292,219
Claims priority, application Italy, July 23, 1962, 14,919/62; Mar. 15, 1963, 5,322/63
5 Claims. (Cl. 321—8)

This invention relates to alternating current generators provided with a rectifier unit comprising semi-conductor diodes of the crystal type, more particularly for motor vehicles.

In known alternating current generators of the abovementioned type the diodes of the rectifier unit are mounted on the stator of the alternating current generators on the side opposite to the controls for the alternating current generator.

More particularly, in a six-diode rectifier unit three diodes are electrically connected in such manner as to bias the stator body to a negative potential and shall be referred to for the sake of simplicity as negative diodes, the negative diodes being mounted on the cover plate supporting the bearing for the rotor shaft. The remaining three diodes or positive diodes are mounted on a metal plate which is electrically insulated from the stator and is secured to the cover plate, the positive diodes biassing the said plate to a positive potential.

The diodes are connected in a known manner by pairs, each pair comprising a negative and a positive diode, the cathode of the negative diode being connected to the anode of the positive diode as well as to one phase winding of the alternating current generator by means of electric leads having their ends secured by welding or rolling.

Consequently, the supports to which the rectifier diodes are secured, are connected to the stator by the welded or rolled junction.

This entails the necessity of disassembling, hence the removal and restoring of the welded or rolled junctions for the ends of the rectifier diodes to the phase windings.

In the abovementioned constructions assembly and replacement of the diodes are difficult to carry out inasmuch as the space around the diodes is hardly accessible.

An object of this invention is to provide an alternating current generator of the abovementioned type wherein the rectifier unit is adapted to be fitted on the stator of the alternating current generator and is provided with means for easy and safe assembly on the generator.

A further object of this invention is to provide an alternating current generator of the abovementioned type, in which the rectifier unit is easily electrically connectable with the generator.

A further object of the invention is to provide an alternating current generator of the abovementioned type, in which faulty diodes can be replaced without disassembling the generator to its components, by simply bodily removing the rectifier unit from the generator.

A further object of this invention is to provide, in the case of any damage to the diodes, for replacement of the whole rectifier unit without removing the alternating current generator from the vehicle.

According to this invention with the above objects in view an alternating current generator is provided with a rectifier unit comprising semi-conductor diodes of the crystal type, wherein the rectifier unit is in the form of a unit separate from the generator unit, adapted to be electrically connected to the phase windings on the latter and to be mechanically connected to the generator casing the generator and rectifier units being provided with means for effecting such electrical and mechanical connections.

The invention shall be described with reference to the accompanying drawings which show an embodiment thereof by way of example.

FIGURE 5 is a known wiring diagram of the alternating current generator and three-phase rectifier bridge;

FIGURE 6 is an axial sectional view of an alternative construction of the three-phase rectifier bridge unit on line VI—VI of FIG. 7;

FIGURE 9 is an axial sectional view of a further embodiment of the device on line IX—IX of FIG. 10, and FIGURE 10 is a front view on line X—X of FIG. 9.

Figure 1:
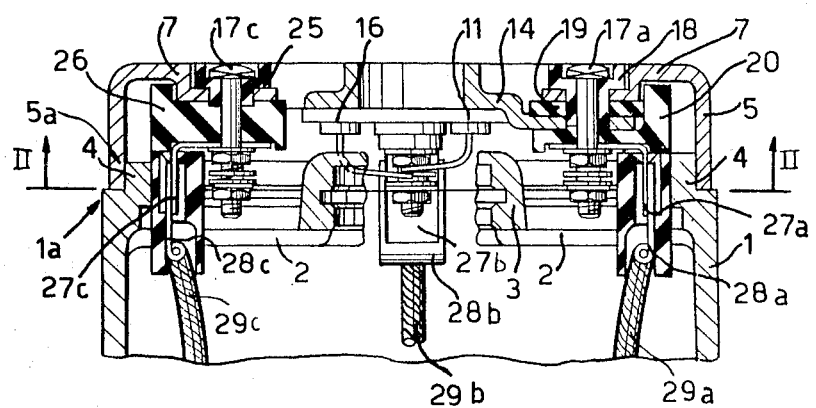
FIGURE 1 is an axial sectional part view on line I—I of FIGURE 2 of the alternating current generator according to this invention.
Figure 3:
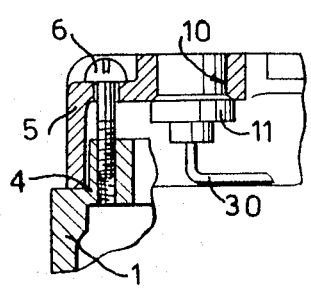
FIGURE 3 is a part sectional view on line III—III of FIGURE 2.
Figure 4:
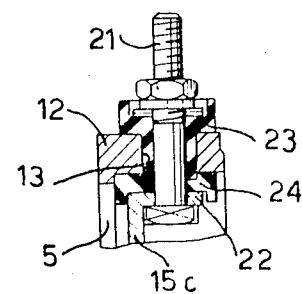
FIGURE 4 is a part sectional view on line IV—IV of FIG. 2.
Figure 2:
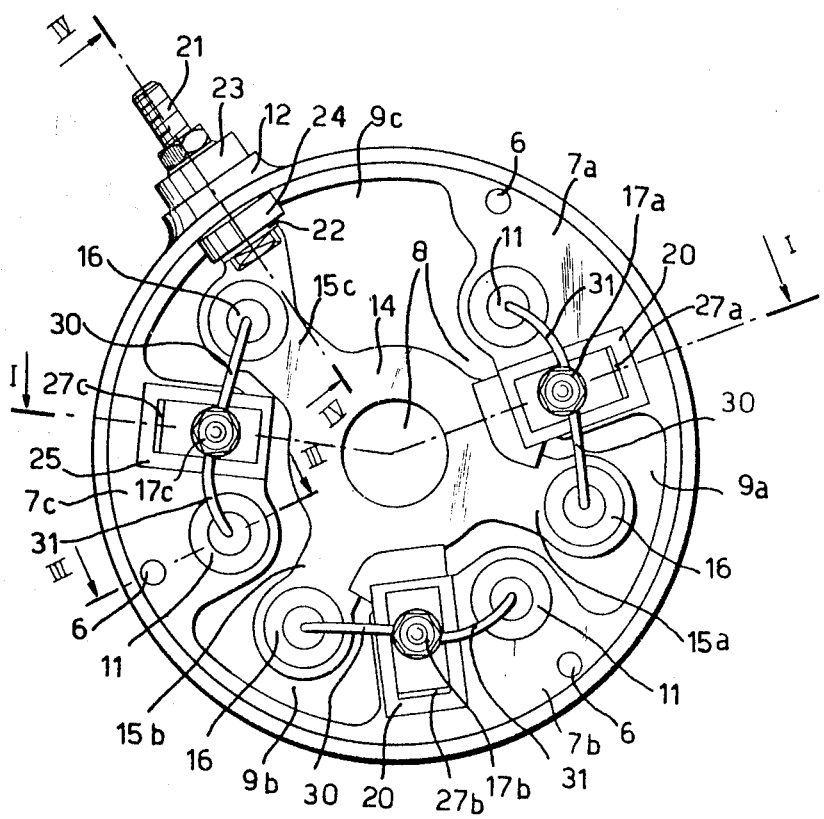
FIGURE 2 is a front view of the three-phase bridge rectifier unit on line II—II of FIG. 1.

Referring to the drawings, 1 denotes the metal casing of the stator of the alternating current generator, having secured thereto by means of a plurality of spokes 2, a support 3 for the rotor shaft (not shown).

The end 1a of the stator casing extending beyond the spokes 2 is formed with a circular step 4 providing a seat and abutment adapted to receive an end portion 5a of the casing of the rectifier unit comprising a metal annulus 5 which is secured to the casing of the stator 1 by means of a plurality of screws 6.

The end portion 5a acts as a seat complementary to the step 4, whereby the rectifier unit can be axially and radially positioned with respect to the stator.

The annulus 5 is provided with three projections 7a, 7b, 7c radially overhanging towards the middle portion 8 of the annulus 5 which is left exposed.

The projections 7a, 7b, 7c are separated by radial spaces 9a, 9b, 9c.

Each projection 7a, 7b, 7c, respectively, is formed with a seat 10 having secured therein in a known manner one of the three negative diodes 11, so that the anodes of the latter are in electrical contact with the annulus 5.

The diodes can be secured in their respective seats in a known manner such as by forcing the diode body portion into the seat. The annulus 5 is provided at the space 9c which in the embodiment shown is wider than the remaining spaces, with a boss 12 having a through bore 13.

A metal plate 14 is located in the bore 8 in the annulus 5 and is formed with three radially extending projections 15a, 15b, 15c received by the spaces 9a, 9b, 9c to prevent electrical contact thereof with the annulus 5.

The projections 15a, 15b, 15c are each formed with a seat adapted to receive one of the three positive diodes 16, respectively, the cathodes of which are in electrical contact with the plate 14.

The plate 14 is secured to the projections 7a, 7b by means of bolts 17a, 17b through the interposition of insulators 18, 19 and 20 which mutually electrically insulate the bolts 17a, 17b, plate 14 and projections 7a, 7b on the annulus 5.

The plate 14 is additionally directly secured to the annulus 5 by means of a bolt 21 extending through the hole 13 and of a flap 22 fixedly secured to the projection 15c. The screw 21 is in electrical contact with the plate 14 but is insulated with respect to the annulus 5 by insulators 23, 24.

The projection 7c on the annulus 5 is provided with a bolt 17c insulated with respect to the projection by insulators 25, 26.

The bolts 17a, 17b, 17c together with their insulator additionally act to secure to their respective projections on the annulus 5 contact plugs 27a, 27b, 27c electrically insulated from the annulus 5.

The contact plugs are fitted on assembly of the rectifier unit into their associated sockets 28a, 28b, 28c connected to the ends of the windings 29a, 29b, 29c, respectively, on the stator 1.

The plug contacts are each electrically connected by leads 30, 31 secured to their respective bolts 17a, 17b, 17c with the cathode and anode of the negative and positive diode, respectively of the pair to form one of the three pairs of associated diodes acting as a known full-wave three-phase rectifier bridge, the output current of which biasses the annulus 5 to a negative potential and the screw 21 to a positive potential.

FIGURE 5 shows a known wiring diagram of a rectifier bridge, wherein the three phase windings R, S, T of the generator are each connected with a diode pair comprising a negative and a positive diode 11, 16, respectively. All the negative diodes are earthed and all the positive diodes are connected with an insulated terminal post acting as a direct current clamp.

Figure 7:
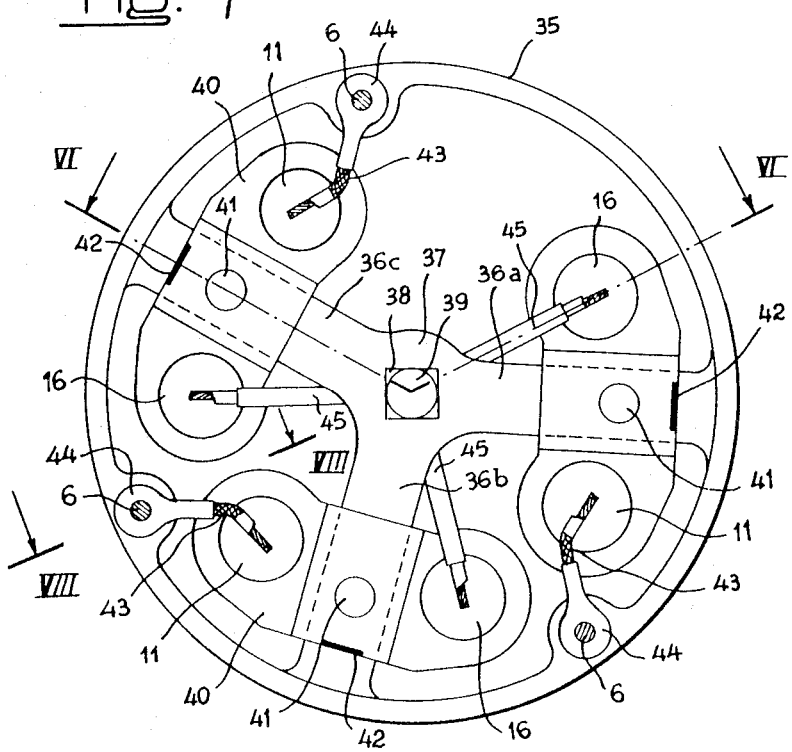
FIGURE 7 is a front view of the three-phase rectifier bridge unit on line VII—VII of FIG. 6.
Figure 8:
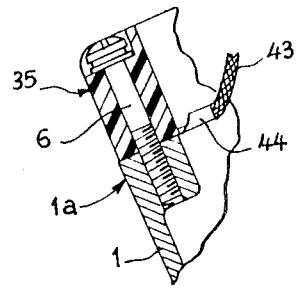
FIGURE 8 is a part sectional view on line VIII—VIII of FIG. 7 and FIG. 10.

FIGURES 6 and 7 show an embodiment of the device according to this invention, in which 1 denotes a support comprising a plurality of spokes 2 carrying a hub 3 for the rotor shaft (not shown).

The end 1a of the support extending beyond the spokes 2 is formed with a circular step 4 acting as a seat and abutment adapted to receive an end portion 35a of the casing of the rectifier unit comprising an annulus 35 which is secured to the body portion of the support 1 by a plurality of screws 6.

The end portion 35a acts as a seat complementary to the step 4, whereby the rectifier unit can be axially and radially positioned with respect to the support for the alternating current generator.

The annulus 35 is provided with three spokes 36a, 36b, 36c connected in the middle of the annulus by a hub portion 37 having a hole 38 bored therein in order to receive a terminal post 39.

A metal plate 40 is secured by means of a rivet 41 to the intermediate portion of each spoke 36a, 36b, 36c, respectively.

The plates 40 are each provided with a plug 42 extending towards the generator, adapted to fit into associated contact sockets 28a, 28b, 28c connected to the ends 29a, 29b, 29c, respectively of the windings R, T, S of the alternating current generator.

As shown in FIGURES 6 and 7 the casing 35 of the rectifier unit and the spokes 36a, 36b, 36c are made of insulating material, such as plastic, whereby the terminal post 39 and plates 40 are electrically insulated from one another and the alternating current generator casing 1.

The plates 40 are each formed with two seats accommodating a pair of rectifier diodes, the negative diode 11 having its anode electrically connected to the plate 40 and its cathode connected to the casing 1 by a lead 43 provided on its free end with an eye plate 44 adapted to be clamped between the casing 1 and casing 35 by its respective screw 6.

The positive diode 16 has its cathode connected with the plate 40 and its anode connected with the terminal post 39 by means of a lead 45.

FIGURES 9 and 10 show a further embodiment of the rectifier unit, in which the casing 1 is formed at its end 1a with a flat head portion deprived of the step 4, the interconnection of the plates 40 and spokes 36a, 36b, 36c, respectively being effected by screw 46 to which the ends 29a, 29b, 29c of the windings R, T, S respectively on the alternating current generator are attached.

According to a further embodiment the casing 35 of the rectifier unit and spokes 36a, 36b, 36c can be made of non-insulating material, such as metal. The plates 40 and screw 39 shall then be electrically insulated by means of suitable insulators (not shown) from the spokes and hub portion 37, respectively.

The advantages of the alternating current generators according to the above described embodiments, provided with a three-phase rectifier bridge unit are as follows.

The alternating current generator and rectifier unit can be assembled as separate units adapted to be mechanically and electrically interconnected in an easy manner.

Replacement of faulty diodes can be effected without disassembling the alternating current generator, merely by removing the rectifier unit.

Electrical and mechanical uncoupling of the diodes can be effected in an extremely easy manner.

A faulty rectifier unit can be replaced by a new one, and repair of the faulty rectifier can be separately effected.

Finally, faulty rectifiers can be detected on a test bench without requiring preliminary disassembly of the diodes of the rectifier unit.

It will be understood that, the principle of the invention being left unaltered, embodiments and constructional details can be widely varied with respect to the non-limiting example described and shown without departing from the scope of this invention.

What I claim is:

1. Alternating current generator provided with a three phase bridge rectifier unit comprising a first plurality of semiconductor diodes and a second similar plurality of semiconductor diodes electrically connected to form associated diode pairs, each diode pair having their inputs electrically connected to their respective generator phase winding, respectively, and their outputs electrically connected in parallel circuit relationship, wherein the generator comprises a tubular casing having in one end thereof a seat, the rectifier unit comprises an annular casing formed at one end with a seat complementary to the first mentioned seat, fixing means for detachably attaching said rectifier casing in said seat in the generator casing, said rectifier casing comprising a plurality of separate electrically conductive plates secured to said casing and electrically insulated therefrom, each plate supporting one diode of the first plurality having its anode connected thereto and its cathode connected to the casing, and one diode of the second plurality having its cathode connected thereto and its anode connected to a common terminal post insulated from said casing end plates, and detachable electrical connections between each generator winding and its respective pair of associated diodes.

2. Alternating current generator as claimed in claim 1, wherein each plate is connected to its respective generator phase winding by means of a plug and socket connection.

3. Alternating current generator as claimed in claim 1, wherein each plate is connected to its respective generator phase winding by means of a lead clamped onto a terminal post provided on each plate.

4. Alternating current generator as claimed in claim 1, wherein the rectifier casing is made of an electrically insulating material.

5. Alternating current generator provided with a three phase bridge rectifier unit comprising a first plurality of semiconductor diodes and a second similar plurality of semiconductor diodes electrically connected to form associated diode pairs, each diode pair having their inputs electrically connected to their respective generator phase winding, respectively, and their outputs electrically connected in parallel circuit relationship, wherein the generator comprises a tubular casing having in one end thereof a seat, the rectifier unit comprises an annular casing formed at one end with a seat complementary to the first mentioned seat, fixing means for detachably attaching said rectifier casing in said seat in the generator casing, said rectifier casing comprising a plate secured to said casing and electrically insulated therefrom, the diodes of the first plurality being supported by the rectifier casing and having their anodes connected thereto, the diodes of the second plurality being supported by said plate and having their cathodes connected thereto, and detachable means for electrically connecting the remaining cathodes and anodes of each pair of diodes to their respective generator phase windings comprising a plug and socket connection, said plate comprising a terminal post.

References Cited by the Examiner
UNITED STATES PATENTS 3,041,484 6/1962 Freer et al. _____ 310—68
3,160,771 12/1964 Martin et al. _____ 321—8

JOHN F. COUCH, *Primary Examiner.*

W. H. BEHA, *Assistant Examiner.*